United States Patent [19]

Buser et al.

[11] 4,380,391

[45] Apr. 19, 1983

[54] SHORT PULSE $CO_2$ LASER FOR RANGING AND TARGET IDENTIFICATION

[75] Inventors: Rudolph G. Buser, Wall, N.J.; Robert S. Rohde, Springfield; Neal T. Nomiyama, Reston, both of Va.

[73] Assignee: The United States of America as represented by the Secretary of the Army, Washington, D.C.

[21] Appl. No.: 192,275

[22] Filed: Sep. 30, 1980

[51] Int. Cl.³ .......................... G01C 3/08; G02B 5/14; H01S 3/00; G06K 9/00
[52] U.S. Cl. ........................................ 356/5; 250/227; 332/7.51; 350/374; 350/376; 382/34
[58] Field of Search ................... 356/5; 340/146.3 Q; 350/374, 376; 332/7.51; 250/227

[56] References Cited

U.S. PATENT DOCUMENTS

| | | | |
|---|---|---|---|
| 3,499,110 | 3/1970 | Heckman, Jr. | 356/5 |
| 3,669,541 | 6/1972 | Duguay | 356/5 |
| 3,856,402 | 12/1974 | Low et al. | 356/28.5 |
| 3,947,833 | 3/1976 | Eckstein, Jr. | 340/146.3 Q |
| 4,053,763 | 10/1977 | Harney | 332/7.51 |
| 4,164,373 | 8/1979 | Schuss et al. | 250/227 |
| 4,167,329 | 9/1979 | Jelalian et al. | 356/5 |

FOREIGN PATENT DOCUMENTS 2805190 10/1978 Fed. Rep. of Germany .......... 356/5

OTHER PUBLICATIONS

Davis et al., Appl. Optics, vol. 17, No. 19, Oct. 1, 1978, p. 3184.
T. H. Courtenay et al., Infrared Physics, vol. 16, No. 1-2, Jan.-Mar. 1976, p. 95; 356-5.
R. J. Matthys et al., Proc. Soc. Photo-Opt. Instrum. Eng., vol. 227, 1980, p. 91; 356-5.

Primary Examiner—S. C. Buczinski
Attorney, Agent, or Firm—Nathan Edelberg; Milton W. Lee; Max L. Harwell

[57] ABSTRACT

A short pulse $CO_2$ transverse electrode discharge at atmospheric pressure (TEA) laser device for ranging and target identification which uses an electro-optics Pockels Cell modulator to chop the transmitted laser beam into a train of 0.5 to 2 nanosecond pulses and a broadband receiver for observing the time broadened reflected signals that results from integration of the finite depths of the targets. Because a target has a unique three dimensional profile, the target signature may be identified by comparison with known signatures previously generated by computer simulation or field measurements. The present shortened pulse laser transmitter and a plurality of receiver field-of-view options meet the temporal and signal-to-noise requirements for pattern recognition. The device can be used to provide high accuracy target ranging along with target identification.

10 Claims, 3 Drawing Figures

SHORT PULSE CO₂ LASER FOR RANGING AND TARGET IDENTIFICATION

The invention described herein may be manufactured, used, and licensed by the U.S. Government for governmental purposes without the payment of any royalties thereon.

BACKGROUND OF THE INVENTION

1. Field of the Invention

The invention is in the field of laser rangefinders operating in the pulsed mode which emits a train of pulses having a fast rising edge or falling edge, or both, in which the two way times-of-travel is measured to provide the range of a target, and a broadened return signal provide a signature of the target for comparison with a known target.

2. Description of the Prior Art

Laser rangefinder generally operate in one of two modes. One mode may be a continuous wave (CW) operation where the relative phase between the transmitted optical signal and the reflected signal determine the roundtrip time between the target and the transmitter. The other method is to use a pulsed laser which emits a pulse with a fast rising edge or falling edge, or both. The time-of-flight is measured which provides the distance between the target and the transceiver.

Depending on the signal-to-noise ratio (SNR), the ranging accuracy in the pulse mode can be excellent for strong SNR, or poor when operating under low SNR. By measuring the time when the rising edge crosses the threshold set by the user, and by comparing that time with the time of transmission, a roundtrip time can be calculated, and hence, the distance to the target determined since the range is related to time of flight by this equation, $R = ct$, where c is speed of light and t is time of flight. The accuracy of the laser rangefinder is also degraded by the target depth. In a real scenario, the laser beam illuminates the entire target and since the target has depth, each scattering center, which is located at different depths of the target, contributes to the reflected signal at unique times. The resulting signal is broadened in time and hence contributes to the degradation in ranging accuracy. For a Nd:YAG laser the ranging accuracy for a single pulse for a flat target is limited by the rise time (10 ns), or 3 meters, under poor transmitting conditions. For a CO₂ laser with a rising time of 40 ns, the minimum ranging accuracy is 12 meters. To obtain a target range resolved signature that is unique to a particular target and viewing angle, a short transmitted pulse is necessary to illuminate the target or otherwise the return signal would be integrated not only in cross range but in depth as well. Clearly, with a target depth of 5 to 10 meters, target range resolved signatures cannot yield target identification if the probing pulse integrates over 20 meters. What is needed, therefore, to reduce the time integration of the pulsewidth is a laser source with short pulsewidths, of 1 to 2 nanoseconds, with sufficient power to generate unique range resolved cross sections. Compact, mechanically stable and simple CO₂ lasers do not exist at this moment that can produce 10.6 μm laser pulses with 1 to 2 nanosecond pulsewidths. One device which can yield 1 to 3 nanosecond pulses is the mode-locked laser, but this device is undesirable because of its undesirably long cavity length.

The signal to noise (SNR) limitations of the range resolved cross sections is overcome by the present inventive device which uses a CO₂ transverse electrode discharge at atmospheric pressure (TEA) laser that can yield up to 10 megawatts of power for a reasonable size laser and has its output chopped into short pulsewidths by a modulator.

SUMMARY OF THE INVENTION

The purpose of the present device is to produce an optical return signal which can be used in pattern recognition to identify various targets along with determining the range of the targets. The object of the invention is to probe the target with very short CO₂ laser pulsewidths to a finite depth of the target in which the short pulsewidths will reduce time integration (over the pulsewidth) effects on the target signature. Because a target can have a unique three dimensional profile, the target signature can be used to identify it by comparing its signature with known signatures which are generated by computer models, or by actual field measurements.

The present device is comprised of a CO₂ laser and an electro-optic Pockels Cell modulator for transmitting a train of 0.5 to 2 nanosecond pulsewidths therefrom and a plurality of receiver concepts that meet the temporal and SNR requirements for pattern recognition.

The present device is comprised of a CO₂ TEA laser that produces laser gain switched spikes therefrom of approximately 60 to 100 nanoseconds width with each of these spikes being chopped by an electrooptics Pockels Cell modualtor into a train of 4 or 5 of the 0.5 to 2 nanosecond pulses at 20 nanosecond intervals for each pulse. Target reflected signals are therefore comprised of 4 to 5 pulses of 4 to 5 range resolved cross sections of a target that are several nanoseconds wide and are 20 nanoseconds apart measured from rising edge to rising edge. These target signals may be gathered by common transmitter and received optics. The signal is detected by a broadband detector, such as a photovoltaic Mercury-Cadmium-Telluride (HgCdTe) and is amplified by a wide bandwidth amplifier such that the target return signals may be examined for comparison with known target signatures that are stored in a pattern recognition module. Assuming certain statistical fluctuations from the norm, the target return signals can be identified with certain probabilities. This information can be displayed for the user or may be tied into an automatic fire control system.

The invention will be better explained by the detailed description in reference to the following drawings.

DESCRIPTION OF THE PREFERRED EMBODIMENT

Figure 1:
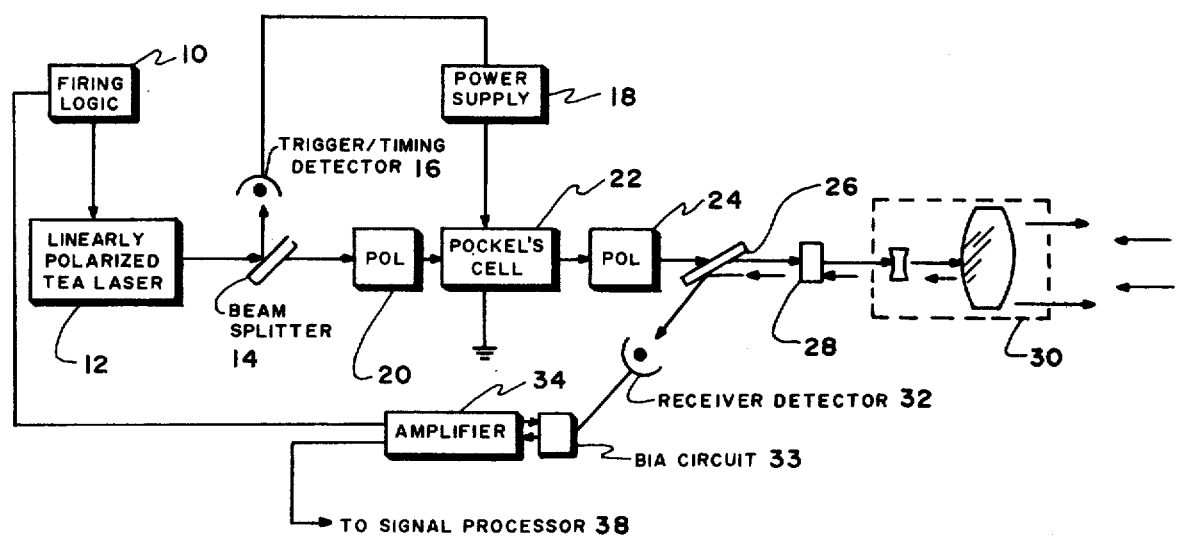
FIG. 1 is a schematic block diagram of the laser transmitter and receiver device.
Figure 2:
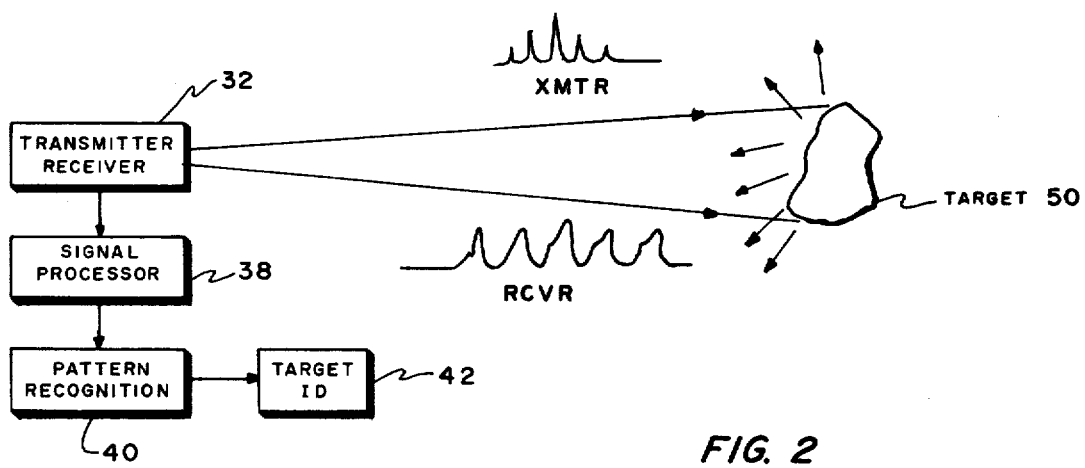
FIG. 2 shows the received target signal processor and target identification circuit.

Referring now to FIGS. 1 and 2, a linearly polarized CO₂ TEA laser 12 is shown that is fired by some firing logic 10, which in this invention may be a spark gap discharge type device that transversely and electrically excites the CO₂ gas mixture of laser 12. The firing logic controls when the device is activated and how often. Firing logic 10 range gates the receiver to improve signal-to-noise by eliminating backscatter. Laser 12 has the capability of yielding 1.0 to 10 megawatts of pulsed power for a reasonably sized laser. A gain switched laser spike pulse is produced by laser 12 and have pulsewidths ranging from 60 to 100 nanoseconds wide. The gain switched spike is much too long for satisfactory target identification since the integration period of the target return pulses would be excessive. However, an electrooptics Pockels Cell modulator 22, which may be a single pass type Cadmium-Telluride Pockels Cell modulator that can be used to chop each spike of the train of laser gain switched spikes into a train of shorter laser pulses of about 0.5 to 2 nanoseconds wide at about 50 megahertz repetition rate, or at 20 nanosecond intervals. The Pockels Cell modulator 22 is repeatedly energized such that 4 or 5 laser pulses separated by 20 nanoseconds are carved out of the original gain switched spike. It should be noted here that if the tail section of each gain switched spike has sufficient signal-to-noise ratio, the tail portion of the $CO_2$ TEA laser pulse may also be modulated and used to generate additional range resolve cross sections from the same original laser pulse. However, throughout this explanation only modulation of the spike itself will be discussed.

The laser gain switched spike is propagated to the first beam splitter 14, which is preferably made of Germanium. Beam splitter 14 reflects a portion of the optical pulse onto a timing detector 16 which triggers the modulator's power supply 18 circuit. The timing detector 16 and modulator's power supply 18 may accomplish the switching of the Pockels Cell by various ways well known in the art, such as by spark gap, krytron circuit, or by use of avalanche transistors. One means of modulating the Pockels Cell that may be used in the present device is taught in an article entitled, "High Performance Avalanche Transistor Switchout for External Pulse Selection at 1.06 NM" by Davis et al, published in Applied Optics, Volume 17, No. 19, page 3184, Oct. 1, 1978, which teaches using an ~1 nanosecond response silicon diode for monitoring a rising pulse envelope from a mode-locked laser to activate an avalanche transistor driver circuit to apply voltage pulses across a Pockels Cell. This allows the Pockels Cell 22 to be modulated when the optical pulse is present within the Pockels Cell. Simultaneously with activation of the pulse triggered Pockels Cell modulator, the remaining output beam passes through the first polarizer 20 to the Pockels Cell modulator 22. The first polarizer 20 is used to further polarize the laser beam. When the Pockels Cell is energized with the halfwave voltage from the power supply 18, modulator 22 rotates the polarization of the laser beam by 90° and thereby allows only a certain polarization component to transmit through the second polarizer. When modulator 22 is activated, the second polarizer 24 will transmit the laser beam therethrough. However, when the voltage is removed from the Pockels Cell modulator 22 and is deactivated, the second polarizer stops the transmission of the laser beam therethrough. The train of laser pulses, separated at 20 nanosecond intervals, propogates through a second Germanium Beam splitter 26 placed at Brewster's angle. Since the laser beam is linearly polarized in the plane of incidence, the laser beam is transmitted through the beam splitter with little loss. A circularly polarizing means 28, such as a quarterwave plate, transforms the linearly polarized laser beam into a circularly polarized laser beam. Common transmitter and receiver optics 30, which may be a Galilean telescope, transmits the circularly polarized laser pulse to a target scene and receives the reflected target signal. These reflected signals represent a train of time broadened pulses arriving at 20 nanosecond intervals that indicate the finite depth of the target and unique signature. The circularly polarized received radiation is converted back to linearly polarized light after passing through the quarter wave plate 28.

There are many receiver concepts that may be used in receiving and processing the reflected target signals for comparison with known target signature stored in a pattern recognition means. The receiver concepts are a wide bandwidth receiving means comprised of a receiver detector 32, preferably a Mercury-Cadmium-Telluride detector of the photovoltaic type, and detector bias circuit 33 and a broadband amplifier 34 which feeds the received and amplifier train of broad bandwidth signals to a signal processor 38. The receiver is range gated by the firing logic 10 in synchronism with the triggering of the linearly polarized $CO_2$ TEA laser 12 to receive and process the train of broadened pulses arriving at 20 nanosecond intervals. Firing logic may range and switch detector 32 off and on at bias circuit 30, or by switching the amplifier 34 for range gating. The target return signals are time modulated by various means into range resolved cross sections to gather target signatures from different zones in the target plane.

Looking now more closely at FIG. 2, the transmitter-receiver block 32 has therein the common transmitter and receiver optics 30 which determines the size of the transmitted laser beam and the field-of-view of the receiver. Each laser beam pulse illuminates the entire target, and since the target has depth each scattering center located at different depths contributes to the reflected signal at different times-of-flight of the reflected broadened target return signal. The target return signals are processed in signal processor 38 with sufficient bandwidth to obtain unique features from the target signature. The signature is analyzed for correlation with a known target signature base in the pattern recognition module. If the target is identified by this module, the user is informed of the target's identity by a display unit. Even if the returned target signals are ambiguous, the information may be used as an aid in identifying the target using other systems.

Figure 3:
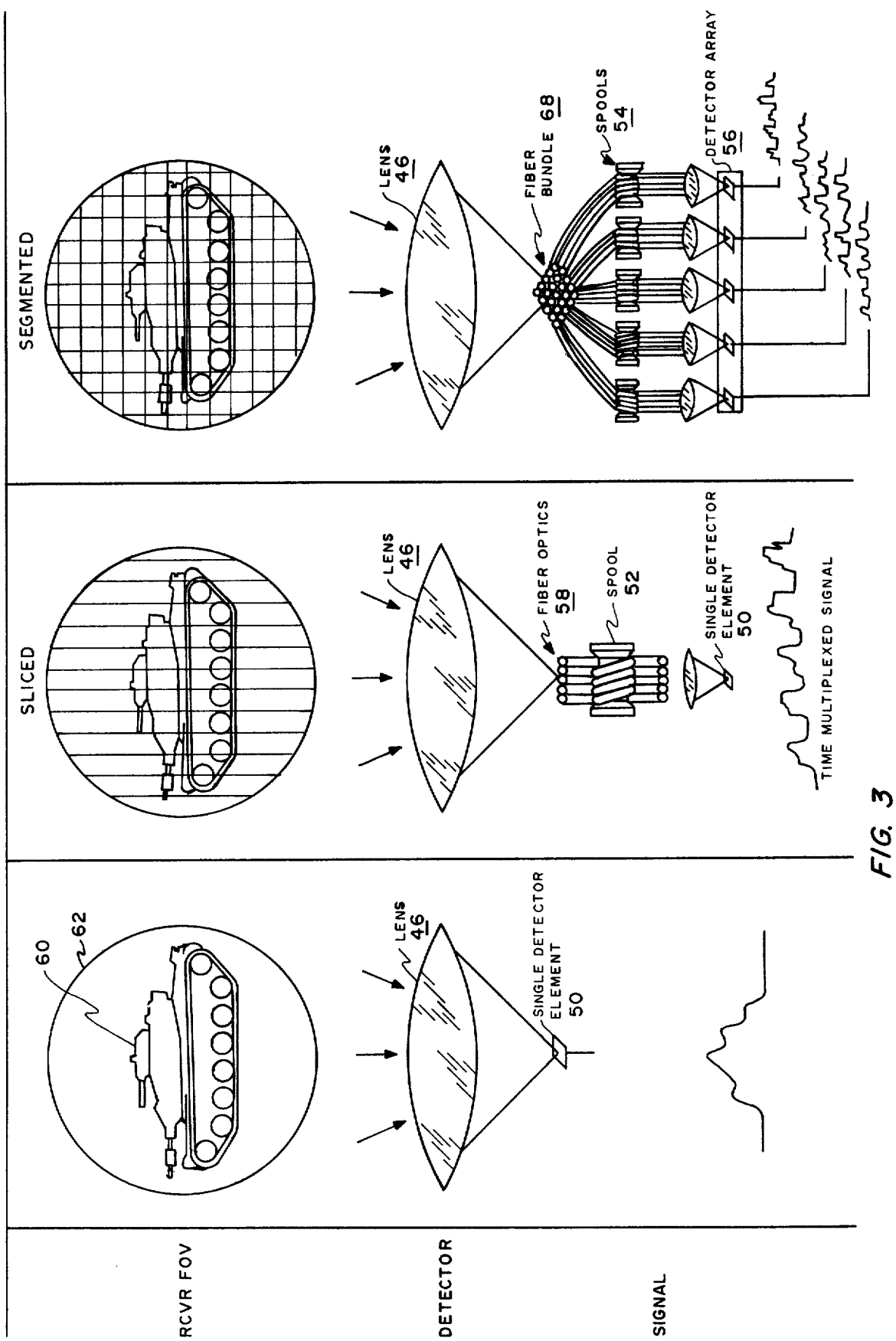
FIG. 3 illustrates three receiver concepts including slicing and segmented receiving and signal processing.

Look now at FIG. 3 for three receiver concepts for the identification of a tank target. The tank target is represented by numeral 60 while numberal 62 represents the field-of-view of optics 30. Lens 46 is shown as being the collecting aperture lens for all three concepts. The concept pictured on the left column is the concept explained herein above. That is, the entire target 60 is illuminated by a laser beam pulse. The collecting aperture lens 46 focuses the returned target signal onto a single detector element 50, which is the equivalent of previously explained detector 32. A single range resolve cross section signal, shown at the lower left portion of FIG. 3, is thus obtained for each laser pulse.

The middle column of FIG. 3 illustrates a sliced field-of-view concept which improves the angular resolution by dividing the field-of-view into bars, or columnar segmented. Associated with each bar is one fiber of an array of fiber optics 58 which is positioned in the focal plane of lens 46 to coincide with the columnar segmented target plane. Each fiber is sensitive to only a portion of the target plane by virtue of its position in the focal plane. The target return signal is time multiplexed by using an assortment of unique fiber lengths to sequentially delay each of the individual signals of the columnar segmented. The fibers are wound on a spool that furnishes the necessary length yet compactness for the various fibers. The outputs from each of the optical fibers are sequentially collected and focused onto the single detector element 50. The target return signal that is processed is from the reflections of only one laser beam pulse which is a time multiplexed signal that corresponds to the different bars, or columnar segments, in the target plane. The advantage gained by gathering target signatures from different bars in the target plane is the reduction of spatial integration experience with the large field-of-view optics 30. However, the disadvantage is the overlapping signals that will occur if multiple pulses are launched at 20 nanosecond intervals.

The third concept of the receiver means is shown in the right column of FIG. 3. This concept has both columnar and row segments, herein called crossed segmented sections, which improves the spatial resolution considerably over the concept illustrates on the left column of FIG. 3, i.e. when the entire target return signal returns from the one laser beam pulse simultaneously. The third concept uses an optical fiber bundle 68 in the focal plane of lens 46, with each fiber element being responsive to a particular position in the target plane. Each row of optical fibers in bundle 68 is wound on one spool of a plurality of spools 54, with each fiber on each spool having lengths that are different. Each spool of fibers time multiplexes a row of the segments and is sequantially detected by one detector in the detector array 56. The range resolved cross section for each segment in the target plane is retrieved from the array of time multiplexed signals by the signal processor 38. The advantage of this cross segmented receiver field-of-view is improved spatial resolution, and again at the expense of a signal-to-noise. It should be noted that in all three concepts the signal-to-noise is improved by range gating.

We claim:

1. A high precision pulsed $CO_2$ laser rangefinder and target identifier device comprised of:
   a linearly polarized $CO_2$ TEA laser triggered by firing logic to produce a train of laser beam gain switched spikes therefrom;
   an electrooptics Pockels Cell modulator in optical alignment with said train of laser beam gain switched spikes;
   means for activating said electrooptics Pockels Cell modulator in synchronism with each spike of said train of laser beam gain switched spikes to chop each of said spikes into a train of short evenly spaced linearly polarized laser pulses at the output therefrom;
   a circularly polarizing quarter wave plate in optical alignment with the output of said electrooptics Pockels Cell modulator for transforming said train of linearly polarized laser pulses into a train of circularly polarized laser pulses;
   common transmitter and receiver optics means for transmitting said train of circularly polarized laser pulses therefrom to a target scene and for receiving target return signals representing time broadened reflected signals that indicate the finite depth of the target and unique signature therethrough wherein said target return signals are converted back to linearly polarized light pulses by passing back through said quarter wave plate;
   a wide bandwidth receiving means that is range gated by said firing logic in synchronism with the triggering of said linearly polarized $CO_2$ TEA laser, said receiving means receiving said target return signals resolving into range resolved cross sections to gather target signatures from different zones in the target plane and signal processing said target signatures; and
   a pattern recognition means having known target signatures stored therein for comparison with target signatures obtained from said target return signals to identify the target being pulsed by said train of circularly polarized laser pulses.

2. A device as set forth in claim 1 wherein said train of laser beam gain switched spikes are approximately 80 to 100 nanoseconds in width in which said electrooptics Pockels Cell modulator means chops each of said spikes into a train of 4 to 5 linearly polarized 10.6 $\mu$m laser pulses of about 0.5 to 2 nanoseconds width at 20 nanosecond intervals.

3. A device as set forth in claim 2 wherein said electrooptics Pockels Cell modulator is made of Cadmium-Telluride.

4. A device as set forth in claim 3 wherein said common transmitter and receiver optics means is a Galilean telescope.

5. A device as set forth in claim 4 wherein said wide bandwidth receiving means is comprised of a receiver detector and detector bias circuit and a wide bandwidth amplifier that feeds said target return signals to a signal processor for processing said target signatures.

6. A device as set forth in claim 5 wherein said receiver detector is a Mercury-Cadmium-Telluride detector of the photovoltaic type.

7. A device as set forth in claim 6 wherein said wide bandwidth receiving means is range gated by said firing logic switching said receiver detector off and on through said detector bias circuit to receive the train of target return signals that have been broadened by the depth of the target and arrive at 20 nanosecond intervals.

8. A device as set forth in claim 7 wherein said wide bandwidth receiving means is comprised of a single detector element and a single range resolved cross section signal of the target is obtained per laser pulse.

9. A device as set forth in claim 7 wherein said wide bandwidth receiving means is comprised of a single detector element in which sliced bars of the field-of-view of the target plane are collected and focused onto the single detector element by a time multiplexing means further comprised of a row of fiber optics positioned in the focal plane in which each fiber has distinctly different fiber lengths to provide sufficient delay times between readout and signal processing of each bar by the single detector and the signal processor.

10. A device as set forth in claim 7 wherein said wide bandwidth receiving means is comprised of a detector array in which cross segmented section of the field-of-view of the target plane are collected and focused onto a detector array by a time multiplexing means further comprised of a bundle of fiber optics positioned in the focal plane of a plurality of collecting lenses wherein each row of fibers of the bundle of fiber optics has a separate fiber optics spool and operates between a separate collecting lens of said plurality of collecting lenses and a separate detector of said detector array wherein each fiber optic has distinctly different fiber length to provide sufficient delay times between readout and signal processing of each of said cross segmented rows of said separate detector and the signal processor.

* * * * *